United States Patent
Fröhlich

[11] Patent Number: 5,961,160
[45] Date of Patent: Oct. 5, 1999

[54] HIGH-PRESSURE CONNECTION SYSTEM

[76] Inventor: Manfred Fröhlich, Ludwig-Thoma-Weg 6, D-75391 Gechingen, Germany

[21] Appl. No.: 09/011,221
[22] PCT Filed: Jul. 31, 1996
[86] PCT No.: PCT/DE96/01419
  § 371 Date: Feb. 9, 1998
  § 102(e) Date: Feb. 9, 1998
[87] PCT Pub. No.: WO97/07356
  PCT Pub. Date: Feb. 27, 1997

[30] Foreign Application Priority Data

Aug. 16, 1995 [DE] Germany ............ 295 13 129 U
Nov. 8, 1995 [DE] Germany ............ 195 41 622

[51] Int. Cl.⁶ .................................................. F16L 17/02
[52] U.S. Cl. ............... 285/342; 285/354; 285/382.7; 285/906; 285/915
[58] Field of Search ......................... 285/342, 343, 285/382.7, 354, 906, 915

[56] References Cited

U.S. PATENT DOCUMENTS

| | | | |
|---|---|---|---|
| 2,394,351 | 2/1946 | Wurzburger | 285/382.7 X |
| 2,585,453 | 2/1952 | Gallagher et al. | 285/382.7 X |
| 2,586,453 | 2/1952 | Gallagher et al. | 251/112 |
| 3,248,135 | 4/1966 | Meripol | 285/323 |
| 3,676,573 | 7/1972 | Avery | 285/382.7 X |
| 4,037,864 | 7/1977 | Anderson et al. | 285/342 |
| 4,136,897 | 1/1979 | Haluch | 285/382.7 X |

FOREIGN PATENT DOCUMENTS

| | | | |
|---|---|---|---|
| 1335121 | 7/1963 | France . | |
| 692666 | 6/1940 | Germany | 285/343 |
| 1515666 | 11/1968 | Germany . | |
| 8017944 | 6/1985 | Germany . | |
| 9003299 | 8/1990 | Germany . | |
| 4038539 | 4/1992 | Germany . | |
| 4103266 | 8/1992 | Germany . | |
| 4219722 | 12/1993 | Germany | 285/382.7 |
| 4229502 | 5/1994 | Germany . | |
| 4343005 | 4/1995 | Germany . | |
| 2712614 | 10/1997 | Germany . | |
| 1233372 | 5/1971 | United Kingdom | 285/382.7 |

OTHER PUBLICATIONS

Ölhydraulik und Pneumatik, vol. 37, No. 4, Apr. 1, 1993, pp. 308–311 Behrens, G.: "Dry Technology" in der fluidischen Verbindungstechnik.

"Wettstreit mit alten Techniken" in the journal "fluid–technid" Verlag moderne Industrie AG, D–86895 Landsberg. pp. 12,14,15 (Jul. 1995).

Company prospectus "EMB" of the company Eifeler Maschinenbau H Heinen GmbH & Co., D–53901 Bad Münstereifel, p. VII/1, 2 (1995).

*Primary Examiner*—Dave W. Arola
*Attorney, Agent, or Firm*—Paul Vincent

[57] ABSTRACT

A connection system for pressure resistant screwed pipe joints with a retention body, a coupling ring, a pipe and a sealing ring is characterized in that an elastomeric high-pressure seal is provided in the form of a first elastomeric sealing element placed between the face of the retention body and the sealing ring and a second sealing element placed between a face of the sealing ring facing the pipe and the outer wall of the pipe.

23 Claims, 8 Drawing Sheets

HIGH-PRESSURE CONNECTION SYSTEM

BACKGROUND OF THE INVENTION

The invention concerns a connection system for high-pressure screwed pipe joints having a standardized retention body with a 24°-connection, a likewise standardized coupling ring for producing a high-pressure connection, a pipe or a connecting member for connecting other system components and a sealing ring which is sealed by means of an elastomer high-pressure seal relative to the retention body and relative to the pipe and which has a front surface which is immediately adjacent to a front surface of the retention body.

A connection system of this kind is known in the art from DE 40 38 539 C1.

In order to manufacture appropriate high-pressure connections, in particular for fluids in high-pressure conduits, purely metallic seals of the double-edged cutting ring type are primarily used in modern day screwed pipe joints in accordance with DIN 2353 which are nearly identical from a technical point of view. The double-edged cutting ring thereby performs both a sealing as well as a holding function for the corresponding connection system. Increased demands by users have recently, however, led to an increasing desire for additional elastomer seals. Simple sealing devices for cutting rings as e. g. described in DE 41 03 266 A1 or DE 80 17 944.8 U1 as well as in DE 42 29 502 A1 have not been commercially successful up to this point in time since either the handling or the necessary pipe preparation is too difficult or expensive for the system at hand.

The most recent prior art in cutting ring systems has a connection system having two-part rings in combination with a DIN retention body with a DIN coupling ring as, e. g. described in the above cited DE 40 38 539 C1. This conventional system advantageously separates the holding function and the sealing function. As already known in the art from older publications (see e. g. DE 27 12 614 A1) and, above all, proved in practical applications, a two-part ring, due to the separated clamping and resilient functions, has substantial advantages compared to a one-part ring having a double function. In principle, the system in accordance with DE 27 12 614 A1 is distinguished from the connection system according to the above cited DE 40 38 539 C1 only in that the first system does not utilize a DIN connector and has therefore not been commercially successful.

An even older pipe coupling system is known in the art from DT 15 25 666 C3 which is particularly used for gas applications and which was not capable of achieving an improved degree of sealing using an additional elastomer seal, since the purely metallic seal described therein already guaranteed the best possible degree of sealing even in Helium leak tests of the associated coupled pipes.

The connection system in accordance with DE 40 38 539 C1 had essentially taken adopted the partial solution already known in the art from previous publications (for the sealing element e. g. DE 90 03 299.3 U1; for the cutting ring and the cutting ring sided portion of the sealing element e. g. DE 27 12 614 A1 or DT 15 25 666 C3) and transformed same into a DIN compatible form. However, the conventional system still has serious disadvantages:

All conventional block-mounted cutting rings with which a front-sided abutment surface seats in a planar, play-free manner on the front surface of the retention body, lose flexibility due to the rigid frictional connection so that premature pipe breakage on the coupling ring side and even leakage on the screw threads of the retention body can occur. The conventional system of DE 40 38 539 C1 is also block-mounted in this fashion.

During assembly, one has the general problem that although the intended end of the assembly is visible when the coupling ring is loosened, one cannot, however, observe when the cutting ring has begun to cut into the pipe and whether or not the effective cut path is sufficient for effecting the entire holding force. The conventional coupling system does not allow for the additional cutting which might be necessary, e. g. in the event that the pipe was not in complete abutment at the beginning of cutting or if the wall of the pipe is inwardly distorted.

In both cases, subsequent handling would cause a reduction in the retention force on the thread so that the coupling ring would become loosened and the elastomer seal would no longer be contained and would be pressed through the resulting gap in an outward direction. As a result of same, a subsequent tightening of the seal would no longer guarantee the sealing function. The assembler would thereby only have the option of additional tightening of the coupling ring which, however, leads, with high probability, to excessive constriction of the pipe on the 90°-cone of the coupling ring so that premature pipe breakage due to shearing was nearly inevitable.

Nor would an exchange of the soft sealing element be sensible, since this would not fundamentally change the basic problem described above. Loosening of the sealing composite would again create a gap between the retention body and the sealing ring which is in any event already present at least to a certain degree from the outset due to the DIN tolerances between the sealing ring and the pipe. The single sealing element of the elastomer high pressure seal used in the conventional connecting system would then once more be drawn into the gap to no longer be able (or only partially be able) to perform its sealing function at the other side.

A completely different prior art is represented by the pipe connections having so-called tapered seal screws. For example, known from the company catalogue EMB of the company Eifeler Maschinenbau, H. Heinen GmbH & Co, D-53901 Bad Münstereifel, page VII/1, 2 (1995) is a "weld nipple screw pipe joint" with which a weld nipple having an approximately conical head is welded onto an end of a pipe intended to contain high-pressure fluid. A connector with a corresponding inner cone is then screwed against the other side of the weld nipple using a coupling ring. This type of conventional welding nipple screwed pipe joint is intended to be used, in particular, under difficult operating conditions, for example, under extreme vibration and alternating load conditions, high-pressure shocks in installations, and extreme temperature and temperature variations. In particular, this type of high-pressure screw pipe joint is utilized in installations with which down times would be associated with very high costs. A substantial disadvantage of this connecting method is, however, that the welding nipples are relatively expensive lathe components the assembly of which (welding) is also time consuming and therefore expensive and the weldment nipple leads to additional substantial inventory costs.

A substantially more economical solution is provided by a completely new type of screwed pipe joint as described in the magazine article "Competition with Old Technology" in the magazine "fluid-technik", Verlag Moderne Industrie AG, D 86895 Landsberg, page 12, 14 and 15 of July 1995. Instead of welding-on of a weld nipple, in this type of hydraulic screwed pipe joint the corresponding end of the pipe is reshaped without cutting with the assistance of an appropriate shaping machine so that, on the pipe end, a tapered seal likewise occurs as in the conventional tapered seal screw joint. This system has, however, the disadvantage that no additional soft seal is provided for. The hydraulic high-pressure sealing effect is intended to be gained solely via an area seal between the tapered outer surface of the shaped tapered seal on the pipe end and the conical inner surface in the retention body. This could hardly be tolerated in particular, in installations where down times would lead to extremely high costs. In addition, a retroactive exchange of damaged sealing elements is essentially impossible, since, when tightening the retention body against the end of the pipe using a coupling ring the tapered seal formed on the end of the pipe would most likely be deformed so that, after loosening and renewed tightening of the pipe joint, the required high-pressure sealing which might have been present following first assembly of the pipe joint would only rarely be re-established.

In contrast thereto, it is the purpose of the present invention to create a connection system having the features described above which, with as few technical changes as possible, combines the advantages of the system having a two-part ring with an improved sealing performance of less rigid systems, wherein a retroactive exchange of damaged sealing elements is facilitated and which can, in principle, be utilized not only with pipe connections having cutting rings but also with those having tapered seals.

SUMMARY OF THE INVENTION

This purpose is achieved in accordance with the invention in that the elastomer high-pressure seal comprises a first elastomer sealing element disposed between the front surface of the retention body and the sealing ring as well as a second sealing element disposed between a surface of the sealing ring facing the pipe or the connecting member and the outer wall of the pipe or connecting member.

Instead of utilizing one single elastomer sealing element captured between the conical surface of the retention body, the outer pipe wall and the radial ring surface also situated in the conical region, as e. g. proposed in DE 40 38 539 C1, in accordance with the invention, two spatially separated sealing zones are created namely, via the first elastomer sealing element, between the sealing ring and the retention body and, via the second elastomer sealing ring, between the sealing ring and the pipe. In this manner the advantages of a specialized sealing ring are maintained, using an elastomer sealing element, which does not have to perform a holding function, rather only has to guarantee the sealing function. In addition, the sealing behavior is substantially improved through the spatial separation of the two sealing locations, the advantages of which are per se known in the art through DE 42 29 502 A1.

There is also the further advantage that the elastomer seal, as seen in the direction of the fluid which is to be outwardly sealed, is positioned in front of the metallic cutting seal of the cutting ring so that the cutting seal performs a certain added safety function in the event that the elastomer seal between the sealing ring and the pipe fails. In contrast to conventional connecting systems in accordance with DE 42 29 502 A1, configuration of the second elastomer seal directly following the cutting ring causes the material displacement effected by the cutting ring on the outer side of the pipe to substantially improve the sealing properties of the second elastomer seal.

In the event that the elastomer high-pressure seal subsequently becomes damaged, the connection system in accordance with the invention can be loosened by unscrewing the coupling ring. The cutting ring thereby remains substantially stationary and imbedded in the pipe. The sealing ring with the elastomer sealing element can then easily be replaced with another sealing ring. Alternatively, the elastomer sealing element per se can also be replaced without having to worry about the above described negative effects of the drawing-in of elastomer material into a gap. An additional simple retroactive possibility for repair of a leaking elastomer seal in the connecting system in accordance with the invention is effected through introduction of a conventional O-ring into the conical region of the retention body, to at least effect a sealing composite which is per se known in the art from the above cited DE 40 38 539 C1.

The sealing ring having the elastomer sealing element in accordance with the connecting system of the invention can advantageously also be used to replace damaged conventional sealing rings in an already assembled system of prior art should leaks occur therein. Due to the requirements imposed through use of a standardized retention body and a DIN coupling ring in the connecting system in accordance with the invention, one is assured of geometric compatibility of the two-part ring so that one must only take into consideration that the sealing ring of the connecting system in accordance with the invention be adapted, at its side facing the cutting or clamping ring, thereto.

A highly important additional advantage of the present invention is that the proposed connecting system can be used not only in connection with cutting seals but also for tapered seal pipe connections. In this case the retention part is not, as had been common, pulled directly against the tapered seal using a coupling ring, rather the sealing ring in accordance with the invention with its elastomer sealing element, is disposed between the retention body and the tapered seal. In this manner a defined and secure soft seal is guaranteed by the elastomer sealing element. An additional area seal is also effected between the seating surface of the sealing ring in accordance with the invention and the outer surface of the tapered seal which replaces the conventional area seal between the conical retention bore of the retention body and the outer surface of the tapered seal. In the event that the sealing composition in the vicinity of the sealing ring in accordance with the invention becomes damaged, the sealing ring can be easily exchanged.

In an advantageous embodiment of the connecting system in accordance with the invention, at least the first elastomer sealing element, and preferentially also the second elastomer sealing element, are accepted in a recess in the sealing ring. In this manner a substantially complete capturing of the elastomer sealing material is guaranteed.

In embodiments, the first and/or second elastomer sealing element can be a separate component in the form of an O-ring, a flat sealing element or the like. Alternatively, the elastomer sealing element can also be firmly attached to the sealing ring, in-particular vulcanized or glued thereto. The advantage of the first mentioned embodiment is that a damaged sealing element can be separately replaced without having to replace the entire sealing ring. The second alternative has the advantage of simpler handling of the elastomer sealing element firmly attached to the sealing ring with only one single component having to be inserted and positioned.

In a particularly preferred embodiment of the connecting system in accordance with the invention, the front surface of the sealing ring limits the front side of that section of the sealing ring projecting to the furthest axial extent towards the retention body so that no portion of the sealing ring can project into the conical 24°-recess of the retention body. These types of embodiments can, in particular, be utilized in combination with specialized non-tapered connectors which replace the conventional standardized DIN retention body and which e.g. can have a reduced insertion depth for the pipe. These type of specialized connectors can have substantially increased mechanical stability compared to the standardized retention bodies and are therefore particularly suitable for use in extreme load-changing stressing of the high-pressure fluid system to be connected or with pressures which far exceed the DIN limits. In this manner, completely new kinds of applications can be established for the connecting system in accordance with the invention.

The embodiment mentioned also has advantages when utilizing a DIN retention body. Due to the continuous front surface, it is particularly easy to work during manufacture and can therefore be sold at a lower price. In addition, substantially less sealing material is -required since it is not necessary to fill-up a large cavity as in prior art: the sealing material must only be present between the oppositely lying sealing surfaces of the retention body and sealing ring.

In a particularly preferred improvement of this embodiment, the first and second elastomer sealing elements are integrally connected to each other to thereby be substantially simpler and more economical to produce than two separate sealing elements. In particular, if the elastomer material is vulcanized onto the sealing ring only one single processing step is required.

The embodiment mentioned can be further improved by disposing the elastomer sealing material of the elastomer high-pressure seal, in an approximately L- or U-shape fashion, around the radial inner edge of the sealing ring facing the pipe or the connecting member. Alternatively, in other embodiments, the sealing ring can have a recess radially inward at its end side facing the retention body which extends approximately conically and which opens towards the retention body and with a sealing element having an approximately triangular cross-section adjacent to the conical recess, one outer surface of which seats on the pipe or on the connecting member and the other outer surface of which at least partially seats on the front surface of the retention body. This embodiment has, compared to those mentioned above, the advantage of a simpler manufacturing of the conical recess on the sealing ring. The alternative embodiment, due to its geometric shape, provides for improved holding of the sealing element on the sealing ring.

It is advantageous to both embodiments when the radially inward outer edge of the L-, U- or triangular-shaped sealing element facing the retention body is slanted or rounded. In this fashion, superfluous sealing material not contributing to the sealing can be avoided.

Alternatively to the above mentioned embodiments, a connection system in accordance with the invention can have a peripheral shoulder disposed radially inwardly on the sealing ring which projects into the conical opening of the retention body in the assembled state of the connecting system. In this manner, a particularly good capturing of the first sealing element is guaranteed with also the 24°-cone of the retention body partially functioning as a cavity wall. In addition, an increased sealing surface is effected between the sealing element and the retention body.

In an advantageous improvement of this embodiment, the first and second elastomer sealing element are formed by a layer of elastomer material attached along the peripheral shoulder of the sealing ring in an integrally coupled fashion and preferentially vulcanized onto the sealing ring. An integral layer of this kind is particularly simple and economical to produce.

In order to save weight and material, an improvement provides that the layer of elastomer material has a small thickness of preferentially approximately ½ mm or less. This thickness is normally completely sufficient.

A configuration of the connecting system in accordance with the invention is also particularly preferred with which the peripheral shoulder is substantially cylindrical and has an axial length, such that it does not abut with the 24°-cone of the retention body in the assembled state of the connecting system. In this manner, the connecting system in accordance of the invention is more mechanically flexible, since an additional rigid frictional connection is eliminated. The screw thread of the retention body is thereby load-relieved and requirements on the dimensional precision of the pipe, e. g. in a curved conduit system for fluids are reduced without compromising safety.

In an alternative embodiment, the peripheral shoulder is substantially conically tapered towards the retention body, preferentially with an angle of approximately 24°. The conical part of the sealing element then takes over the mechanical guide function. In addition, substantially less sealing material is thereby required on the first elastomer sealing element.

An embodiment of the connecting system in accordance with the invention is particularly preferred with which outer thread segments made from elastomer material and adapted to the inner thread of the coupling ring are vulcanized or glued, preferentially symmetrically, onto the outer periphery of the sealing ring. In this manner, preassembled components can be held in the coupling ring when delivered and can be easily separated from each other by means of simple rotation without the need for tools.

In a preferred class of embodiments of the connecting system in accordance with the invention, a cutting or clamping ring is provided for coaxially to the sealing ring which cuts firmly into the outer wall of the pipe or connecting member after assembly of the connecting system. This type of cutting and sealing system has been advantageously used, as described above, in hydraulic applications for many years. The technical advantages of the connecting system in accordance with the invention therefore have particularly effective economical advantages.

In a particularly preferred improvement of this type of embodiment of the connecting system in accordance with the invention, the cutting or clamping ring has a protruding peripheral shoulder which, in the assembled state of the connecting system, projects into a radially inward conical recess of the sealing ring facing the cutting ring or clamping ring and which, departing from an approximately cylindrical extension member, has a conical slant which decreases towards the sealing ring, the slant angle of which is larger the slant angle of the corresponding conical recess of the sealing ring. In this embodiment, a constriction and clamping in the middle region of the cutting ring relative to the sealing ring and the pipe occurs in the over-tightened range. In this manner, a damaging shearing of the cutting ring on the pipe via tilting of the free end of the cutting ring with respect to the pipe is prevented or at least reduced so that a higher degree of pressure safety is achieved with the connecting system.

In another class of embodiments of the connecting system in accordance with the invention, the pipe or the connecting member has a radially outwardly directed peripheral enlargement which serves as an abutment for the coupling ring and also as a stop for the sealing element. As already mentioned above, the inventive concept can also be advantageously utilized in this so-called tapered seal pipe connecting system for the cutting seal systems described above. In particular, providing of an elastomer sealing element in the sealing ring in accordance with the invention leads to an additional sealing effect and therefore to a substantial increase in safety for the high-pressure hydraulic connection. If a seal becomes damaged, its replacement with a new sealing ring is absolutely simple in these systems.

In an advantageous improvement of this type of embodiment of the connecting system in accordance with the invention, the peripheral enlargement increases radially in the outward direction on the sealing ring side in a first section having low steepness, preferentially approximately 24°, and in a second section up to a maximum radial extent having increased steepness, preferentially of approximately 45°. The sealing ring then has, on the enlargement side, corresponding conically shaped sections, preferentially with cone angles of approximately 245° and approoximately 45°. In this fashion, a radial enlargement of the bead diameter is facilitated with tapered seals to further increase the effectiveness of the area seal between the sealing ring and the peripheral enlargement. If necessary, instead of the conventional 24° cone surface of the sealing ring, a 45° cone bore only can also be utilized. However, this usually has the disadvantage that this type of configuration of the sealing ring can only be used for the corresponding tapered seal-pipe connections and not for the standard cutting ring pipe connection.

In a class of advantageous improvements of the tapered seal embodiments, the peripheral enlargement is produced by forming, without cutting, one end of the pipe or a connecting member e.g. by pressing on a pipe end press or by hydraulic shaping. Towards this end, appropriately calibrated shaping tools or, with pipes having larger pipe diameters, high-pressure hydraulic fluids are used to press the pipe wall into the contour of a corresponding opposing shaping tool.

In alternative improvements, the peripheral enlargement is part of a lathe component, preferentially a weld nipple welded onto the pipe, as has been commercially available for many years.

A sealing ring for a connection system of the above mentioned kind is also within the framework of the present invention which is distinguished by a conical recess along at least a portion of its radially inner side and by a flat end surface extending from an axial end and perpendicular to the symmetry axis (a) of the sealing ring. A first elastomer sealing element is thereby disposed on the axial end of the sealing ring having the end surface and a second elastomer sealing element is disposed on the radially innermost region of its radially inner side.

In a particularly simple embodiment of the sealing ring in accordance with the invention, the first and second sealing elements are integrally connected to each other.

The conically shaped recesses of the sealing ring in accordance with the invention preferentially have a cone angle between 20° and 45° and normally the standardized 24°-conical angle. In an additional advantageous embodiment of the sealing ring in accordance with the invention, a radially outer section of the conically shaped recess of steeper cone angle, preferentially of approximately 45°, is axially adjacent to a radially inner section of the cone-shaped recess of flatter cone angle, preferentially of approximately 24°. This type of sealing ring is particularly suited for a tapered seal system having two-stepped slanting of the tapered seal.

An embodiment of the sealing ring in accordance with the invention is also advantageous with which a peripheral section is provided for on the axial end radially within the front surface which projects in the axial direction beyond the end surface as has already been described above in connection with embodiments of the connection system in accordance with the invention.

In particularly preferred embodiments, the sealing ring in accordance with the invention has outer dimensions which permit use in a connecting system with a cutting seal as well in a connecting system with a tapered seal. This kind of universally applicable sealing component can, in contrast to conventional ones, provide extremely high cost savings for completely differing system components.

Additional advantages of the invention can be derived from the description and the drawing. The above mentioned features and those to be further described below can be utilized in accordance with the invention individually or collectively in arbitrary combination. The embodiments shown and described are not to be considered exhaustive enumerations rather have exemplary character only for illustration of the invention.

BRIEF DESCRIPTION OF THE DRAWING

FIG. 2b shows a front-sided plan view of the two-part ring in accordance with FIG. 2a;

DESCRIPTION OF THE PREFERRED EMBODIMENT

Figure 1:
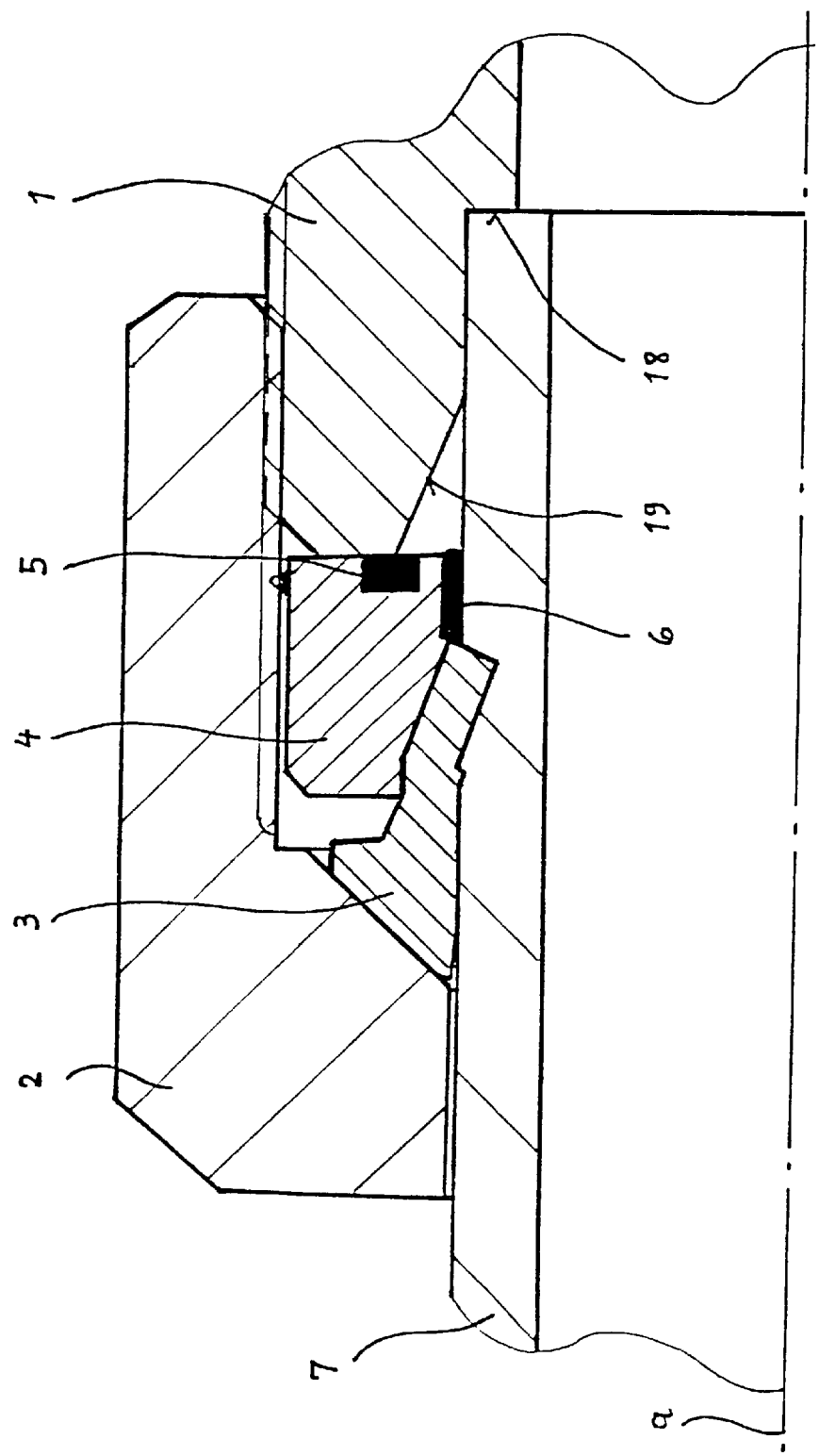
FIG. 1 shows half of a longitudinal cut through a connecting system in accordance with the invention for high-pressure screw pipe joints having cutting seals.

In the embodiment of a connection system in accordance with the invention for high-pressure screwed pipe joints shown in FIG. 1, the upper half (relative to a symmetry axis a) of the screw connection combination can be seen in the tightened condition in half of a longitudinal cut. A pipe 7 which e. g. could also be a connecting member, is connected in a high-pressure sealing fashion to a standardized retention body 1 having a 24° inner cone 19 via a standardized coupling ring 2, a cutting ring 3 which could be a one or two-edged cutting ring or a clamping or wedge ring for holding the pipe, and a sealing ring 4. In the embodiment shown, the cutting ring 3 is deformed through the threaded tightening of the coupling ring 2 against the retention body 1 in such a fashion that it has cut into the outer surface of the pipe 7 to thereby effect a secure seating of the composite. The sealing ring 4 has a first elastomer sealing element 5 which abuts against a front surface 8 of the retention body 1 as well as a second elastomer sealing element 6 which is pushed against the outer surface of the pipe 7 which, for its part, pushes at the front side against a pipe abutment surface 18 of the retention body 1.

Instead of a standardized retention body 1 having a 24° cone 19, the connecting system in accordance with the invention can also utilize a specialized connector (not shown in the drawing) for extremely high pressures having reduced pipe penetration depth and without a retaining cone. The first elastic sealing element 5 then still assumes the sealing function against the corresponding front surface of the connector.

In addition, other soft seals can also be utilized for repairs, for example O-rings or flat sealing rings made from elastomer material which then assume the sealing function of a possibly damaged first or second sealing element. This type of additional soft seal could then, as in prior art, again be captured by the 24° cone of the retention body.

Figure 2A:
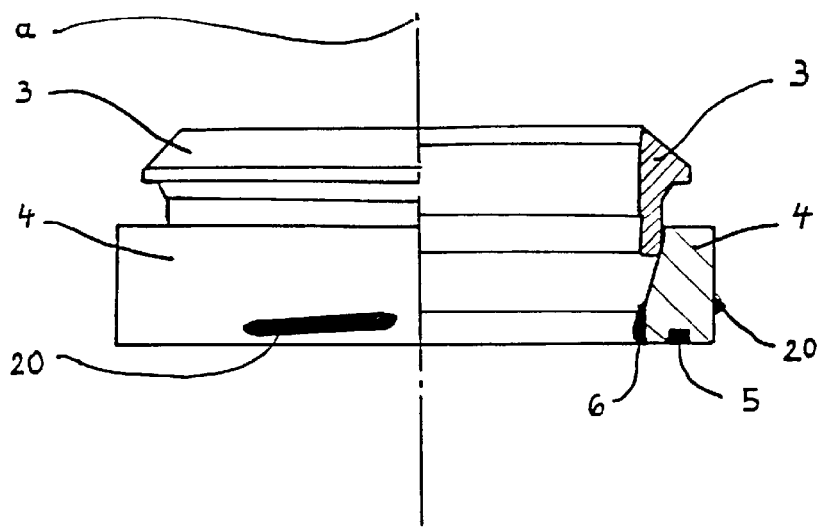
FIG. 2a shows, in the left half, a side view of a two-part ring having a cutting ring in an embodiment of a connection system in accordance with the invention and, in the right half, a schematic longitudinal cut through same.
Figure 2B:
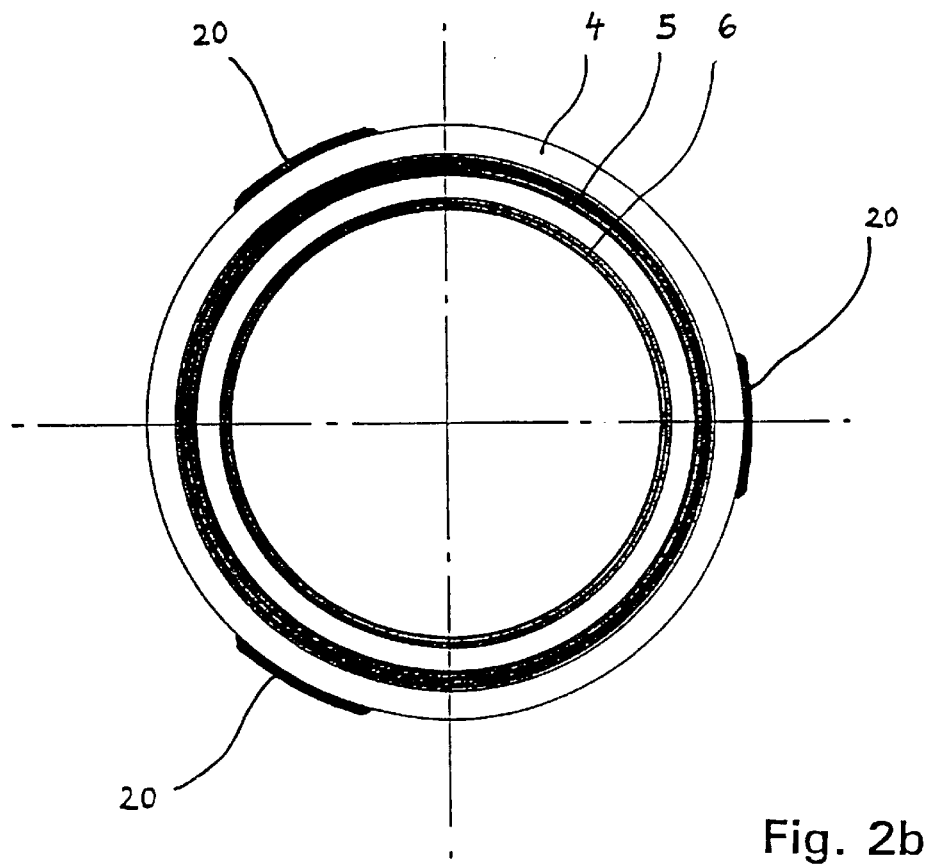

The left side of FIG. 2a shows a side view of the cutting ring 3 shown in FIG. 1 and of the sealing ring 4. The right side of FIG. 2a shows a schematic longitudinal cut through the two-part ring 3, 4 whereas FIG. 2b shows a plan view of the sealing ring 4 according to FIG. 2a. Outer threaded segments 20 made from elastomer material and adapted to the inner thread of the coupling ring 2 of FIG. 1 are distributed symmetrically about the outer periphery of the sealing ring 4, and can be vulcanized onto the sealing ring 4 or glued thereon. In this manner, a bayonet-type interlocking screw connection can be established between the sealing ring 4 and the coupling ring 2 which serves as a preassembly holder for the coupling ring 2, cutting ring 3 and sealing ring 4 and which can easily be separated for final assembly.

Figure 3:
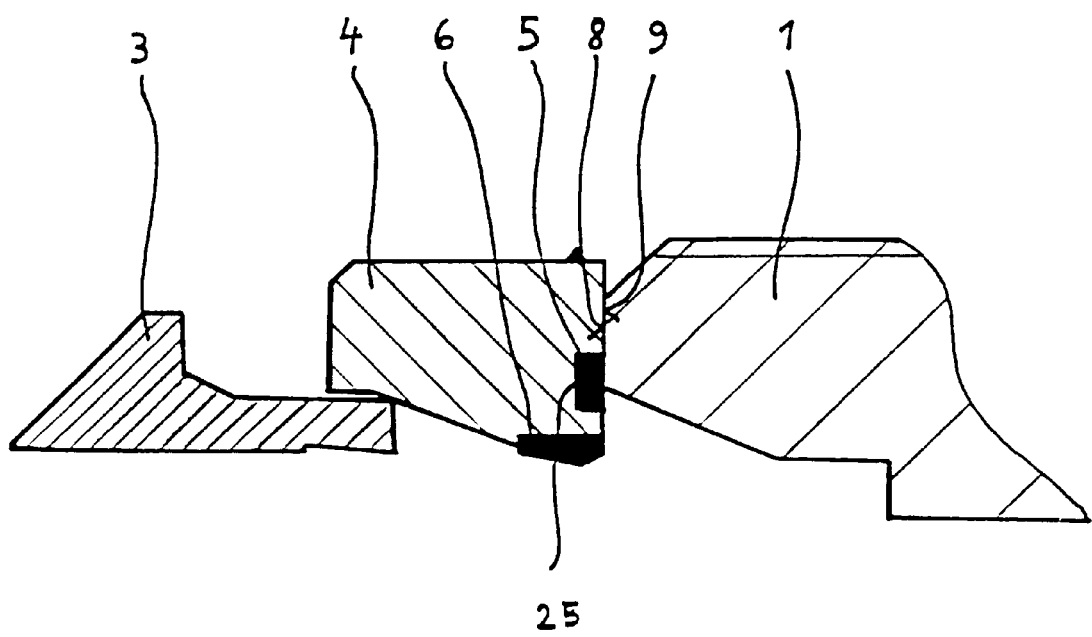
FIG. 3 shows a schematic longitudinal cut through one half of a two-part ring having a cutting ring and a retention body in an embodiment of the connection system in accordance with the invention which has a sealing ring without a shoulder.

FIG. 3 shows an enlargement of the cut representation of elements of the connecting system of FIG. 1, namely the retention body 1, the sealing ring 4 and the cutting ring 3 in a pre-mounted non-tightened state. The sealing ring 4 thereby abuts with its end surface 9 against the end surface 8 of the retention body 1 as a result of which the first elastomer sealing element 5, captured in a recess 25 in the front surface 9 of the sealing ring 4, is pushed against the sealing end surface 8 of the retention body 1. The second elastomer sealing element 6 seats on the outer surface of the pipe (not shown in FIG. 3).

Figure 4A:
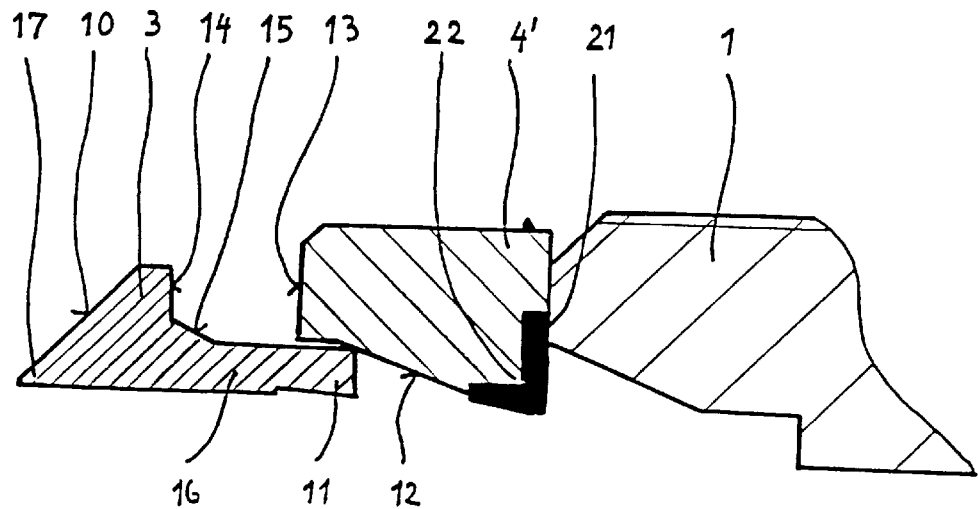
FIG. 4a shows a longitudinal cut as in FIG. 3, but with a one-piece elastomer L-shaped sealing element.

An embodiment of the sealing element 4' is shown in FIG. 4a with which the two elastomer sealing elements are connected to each other to form a single-piece sealing element 21 which, in the embodiment shown, is disposed approximately L-shaped about the radial inner edge 22 of the sealing ring 4'.

Figure 4B:
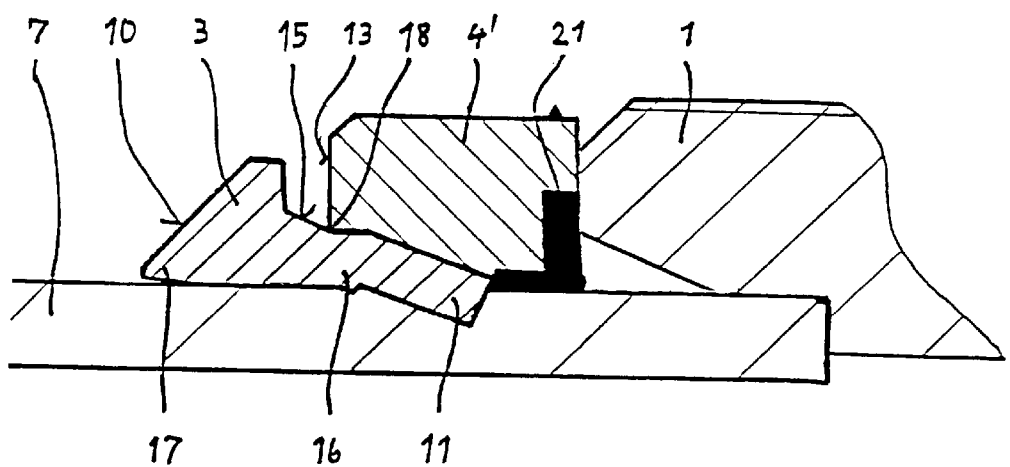
FIG. 4b shows a longitudinal cut as in FIG. 4a, but with a cutting ring, sealing ring and retention body completely assembled in the prescribed final position without overtightening.

FIG. 4b shows the sealing composite in the tightened state. The coupling ring (not shown in the figure) thereby pushes the conical surface 10 of the cutting ring 3 to displace the front section 11 of same below the inner conical surface 12 of the sealing ring 4'. The front section 11 is thereby deflected in an inward direction towards the pipe 7 and its lower edge is imbedded into the outer surface of pipe 7. The end section 11 simultaneously functions as a cavity wall for the pressure-resistant containment of the elastomer sealing element 21. In contrast to prior art, the end surface 14 of the cutting ring 3, which would at most abut with the end surface 13 under extreme over-tightening conditions, no longer serves as a stop for the cutting-ring-sided front surface 13 of the sealing ring 4', rather the conical surface 15 on the cutting ring 3 against which the inner edge 18 of the back-sided end surface 13 abuts.

Due to the possible assembly errors of this type of high-pressure connection system mentioned above, it is advantageous when the cutting ring 3 can be subsequently tightened-up. An additional axial cut path is thereby effected in the system in accordance with the invention. Not only is an additional increase in the pipe clamping force in the region of the conical surface 10 of the cutting ring 3 thereby effected, but also a simultaneous compression of and reduction in the axial length of the cutting ring 3 in its middle region 16, which leads to a tight peripheral clamping of the pipe 7. This kind of cutting ring 3 geometry assures that, when the over-tightening region is reached during assembly, the person performing the assembly feels a clearly recognizable signal in response to the disproportionately large force increase as soon as the inner edge 18 of the sealing ring 4' abuts with the conical surface 15 of the cutting ring 3. Even if over-tightening is necessary, the present geometry of the cutting ring 3 prevents damaging shearing caused by constriction of the pipe, and an even force distribution is effected on the tensioned surface between the middle region 16 and the ring run-out 17 of the cutting ring 3 which serves for additional holding of the pipe.

Figure 5:
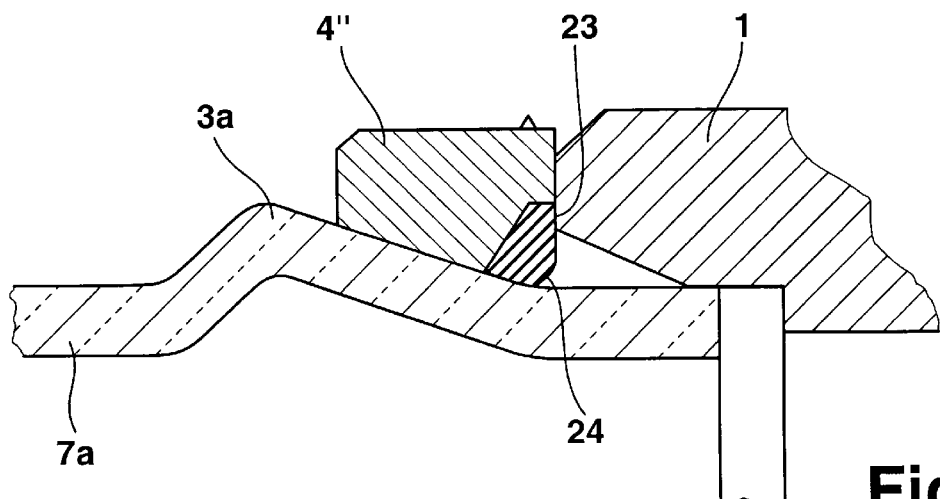
FIG. 5 shows a longitudinal cut as in FIG. 3, but with a triangular-shaped single-piece sealing element.

An additional embodiment of the connecting system in accordance of the invention is shown in FIG. 5 where the sealing ring 4" supports a one-piece substantially triangular-shaped elastomer sealing element 23 having a bevel 24 on its radially inward outer edge.

Figure 6:
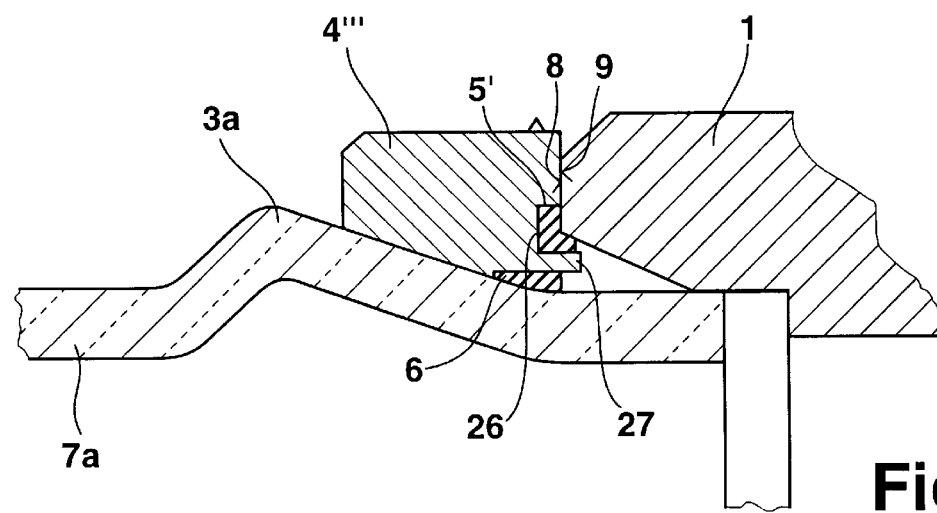
FIG. 6 shows a longitudinal cut as in FIG. 3, wherein the sealing ring has a peripheral shoulder projecting into the 24° cone of the retention body.

FIG. 6 shows an additional embodiment with which a sealing ring 4'" has a radially inward peripheral shoulder 27 which projects into the conical opening 19 of the retention body 1 in the assembled state of the connecting system. The axial length of the shoulder 27 is thereby chosen in such a fashion that it does not abut with the conical surface 19 of the retention body 1 even in the tightened state of the connecting system. The peripheral shoulder 27 creates a nearly completely closed cavity 26 for the first elastomer sealing element 5'.

Alternatively, in an embodiment not shown in the drawing, the peripheral shoulder can be substantially conical and preferentially have an angle of approximately 24° which tapers towards the retention body 1. In this manner, tightening of the connection system leads to contact with the conical surface 19 of the retention body 1, wherein the conical shoulder of the sealing ring is guided over the conical surface 19.

Figure 7:
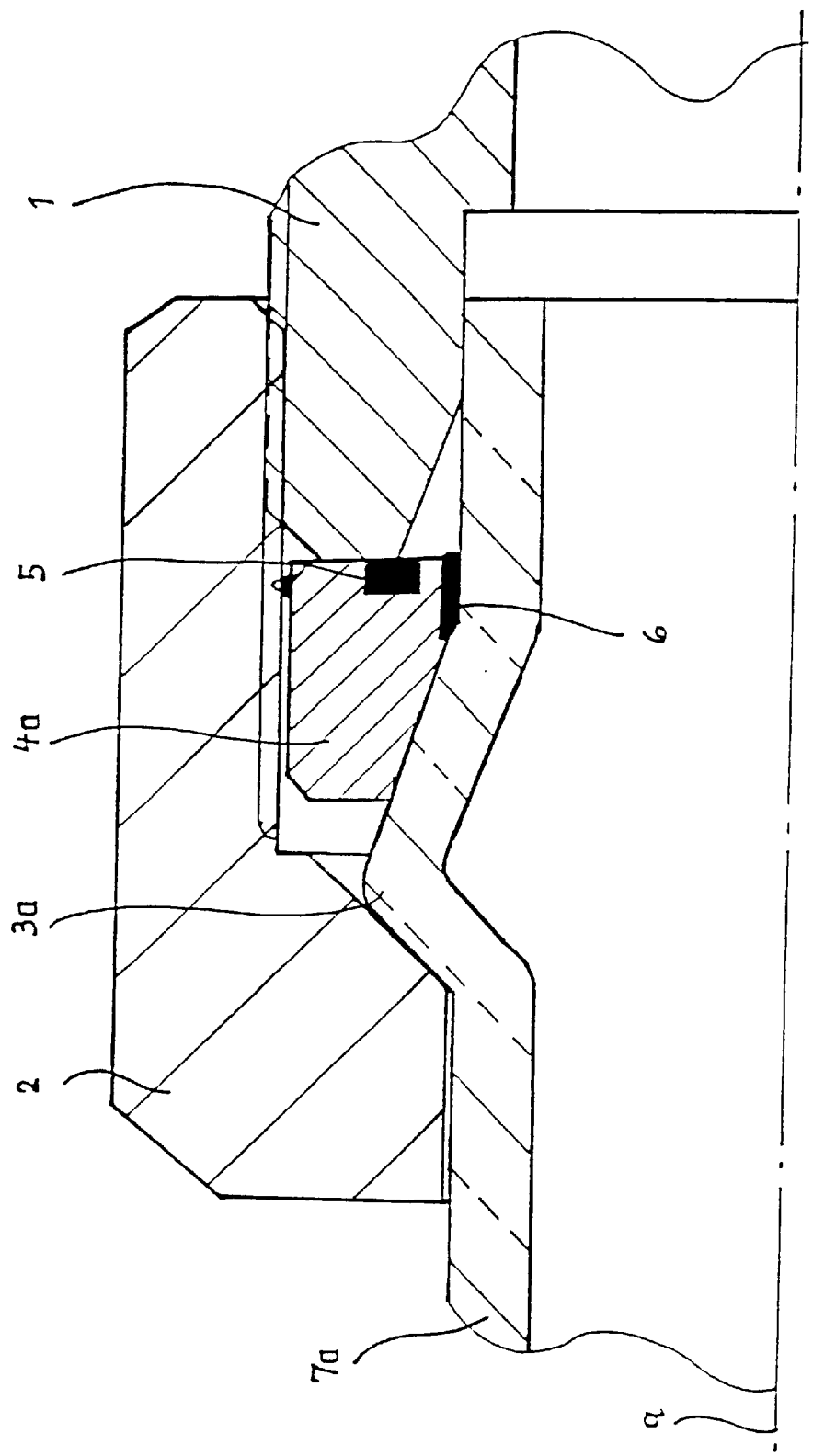
FIG. 7 shows half of a longitudinal cut through a connecting system in accordance with the invention for high-pressure screwed pipe joints having a tapered seal, wherein the sealing ring in accordance with the invention has two separate elastomer sealing elements.

FIG. 7 shows an embodiment of the connecting system in accordance with the invention having a tapered seal pipe connection. Forming of the end, without cutting, of a pipe 7a creates a radially outwardly directed peripheral enlargement 3a against (in the figure) the left conical side of which the 45° inner cone of the coupling ring 2 abuts whereas an adapted conical bore of a sealing ring 4a in accordance with the invention abuts on the slowly increasing 24° conical surface on the other side. Sealing ring 4a has a first elastomer sealing element 5 disposed on the end surface facing the retention body 1, and a second elastomer sealing element 6 seals between the radially inner side of the sealing ring 4a and the pipe. In contrast to the conventional wale-shaped tapered seal, in this case the peripheral edge is further removed from the end of the pipe and the 24° tapered surface does not seat in the retention body 1 rather in the corresponding conical surface of the sealing ring 4a. The sealing function is, in particular, assumed by the elastomer sealing elements 5, 6 and, in the cylindrical portion of the pipe end directly adjacent to its 24° conical surface. In this manner, a sealing effect is obtained which corresponds to that of the conventional cutting ring screw pipe joint so that the compressed peripheral enlargement 3a primarily assumes a holding function only.

Figure 8:
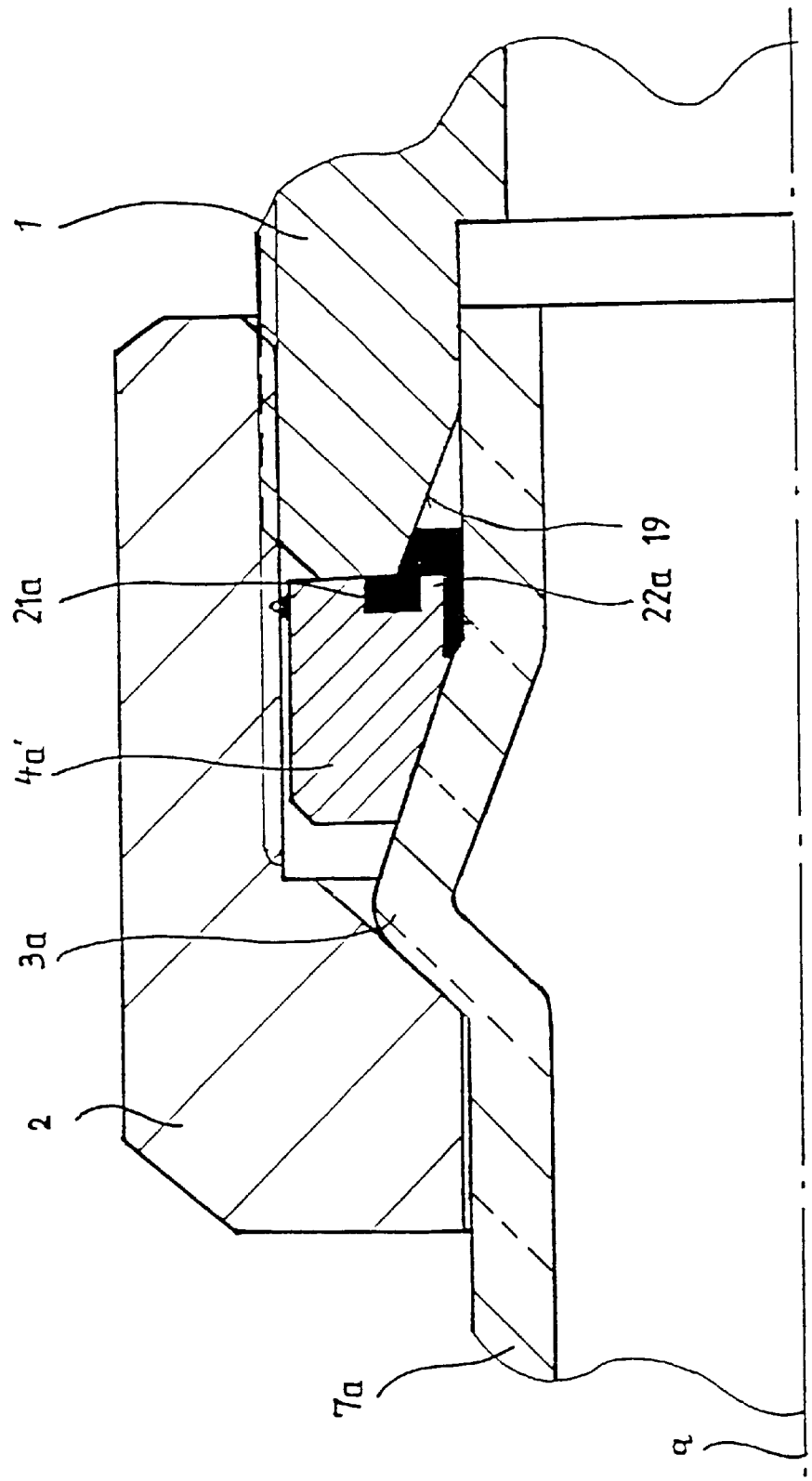
FIG. 8 shows a longitudinal cut as in FIG. 7, however, with a one-piece sealing element on the sealing ring.

The embodiment shown in FIG. 8 differs essentially from that of FIG. 7 in that the sealing ring 4a' has a single-piece U-shaped sealing element 21a disposed along a peripheral shoulder 22a and projecting into the conical opening 19 of the retention body 1.

Figure 9:
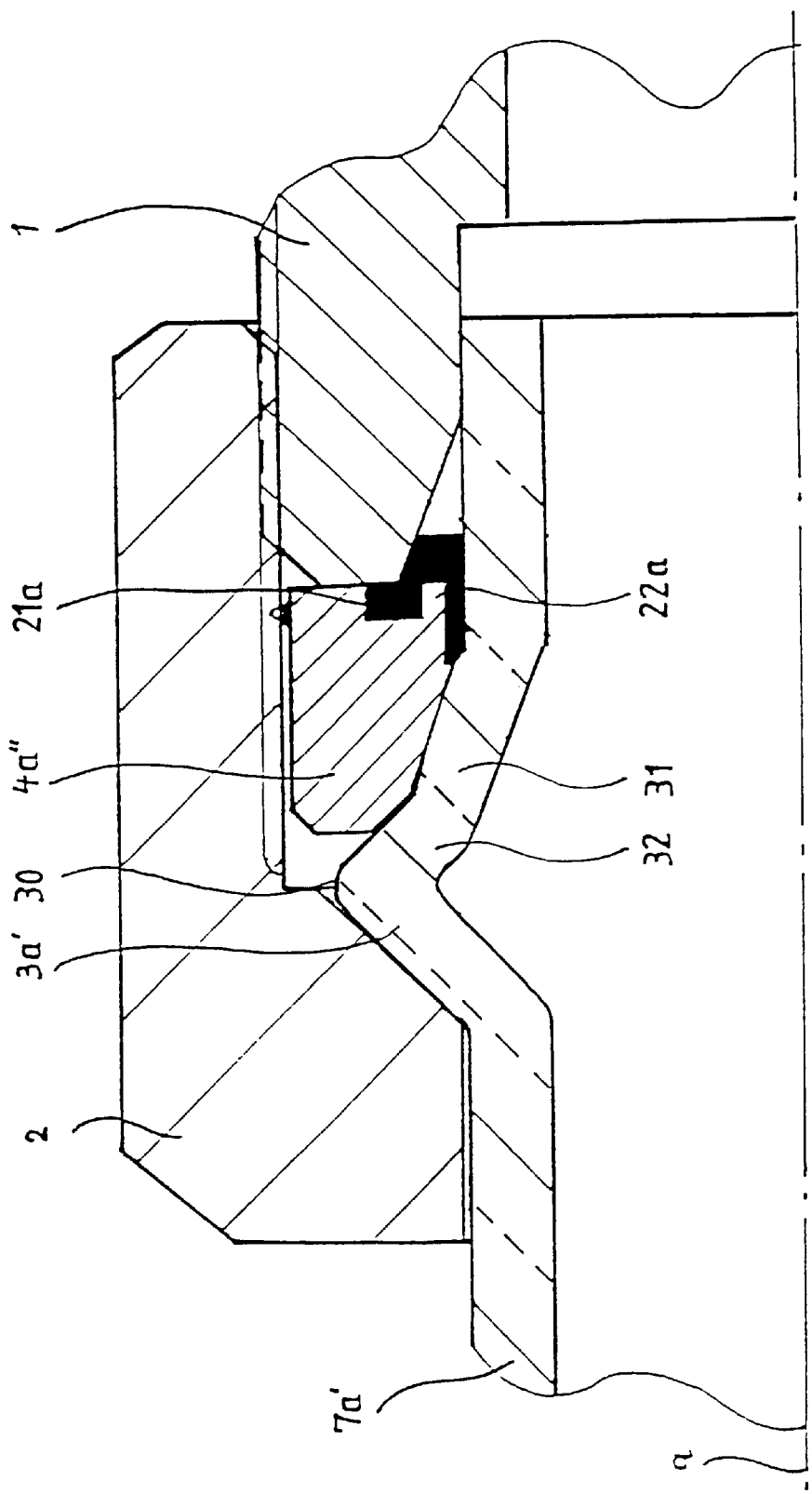
FIG. 9 shows a longitudinal cut as in FIG. 8, however, with 24° and 45° conical surfaces having an associated pitched tapered seal.

Finally, in the embodiment shown in FIG. 9, in contrast to that of FIG. 8, a sealing ring 4a" is provided for which has two differing slant angles for its conically shaped section facing the enlargement, wherein one cone angle is approximately 24°, and the other approximately 45°. In correspondence therewith the conical tilt of the peripheral enlargement 3a', in a first section 31, is somewhat smaller, preferentially approximately 24° whereas, in a second section 32 further removed from sealing ring 4a" and up to the maximum radial extent 30 of the peripheral enlargement 3a', has a larger tilt, preferentially 45° in the radially outward direction. When assembling the sealing ring 4a" in accordance with the invention, the 45° tilt of the peripheral enlargement 3a' effects hard abutment. The maximum radial extent 30 of the peripheral enlargement 3a' can thereby also be enlarged.

In general, the sealing system in accordance with the invention effects improved holding of the pipe for acceptance of vibrations, bending loads, and changing loads and, particularly due to the front-sided elastomer seal on the retention body, allows for a degree of compensation of large imprecisions in the pipe axis in excess of that possible up to this point of time. In prior art, a precise guiding of the sealing ring between the outer diameter of the pipe and the 24° conical surface of the retention body was a unconditional prerequisite for sealing the conventional system. With the connection system in accordance with the invention, a limited amount of over-tightening is possible even with thin-walled pipes with which an additional cutting-in is effected to compensate for tolerances between the outer diameter of the pipe and the inner diameter of the two-part ring.

I claim:

1. A connection system for a high-pressure screwed pipe joint of a pipe member, the pipe member having a radially outward facing peripheral enlargement, the peripheral enlargement having a first and a second surface, the system comprising:

a coupling ring for producing a high-pressure connection, said ring mounted for contact with the first surface of the peripheral enlargement;

a retention body, said retention body having a front surface; and means on said retention body and said coupling ring for connecting said coupling ring to said retention body; and a sealing ring disposed between said retention body and the peripheral enlargement to contact the second surface of the peripheral enlargement adjacent to the first surface thereof, said sealing ring having an inside surface facing an outer wall of the pipe member, a front surface immediately adjacent to said retention body front surface, a first recess containing a first sealing element adjacent to said front surface of said retention body to seal said sealing ring relative to said retention body, and a second sealing element disposed between said inside surface of said sealing ring and the outer wall of the pipe member to seal said sealing ring relative to the pipe member.

2. The system of claim 1, wherein said sealing ring has a second recess for accepting said second sealing element.

3. The system of claim 1, wherein at least one of said first and said second sealing elements is a separate component.

4. The system of claim 1, wherein at least one of said first and said second sealing elements is bonded to said sealing ring.

5. The system of claim 1, wherein said front surface of said sealing ring projects axially in a direction towards said retention body.

6. The system of claim 5, wherein said first and second sealing elements are integrally connected to each other.

7. The system of claim 6, wherein said sealing ring has, on an end facing said retention body, a radially inward conical recess which opens in a direction towards said retention body, and said first and said second sealing elements are disposed adjacent to said conical recess and have a substantially triangular-shaped cross-section, one outer surface of which seats on said pipe member and another outer surface of which on said front surface of said retention body.

8. The system of claim 6, wherein said first and said second sealing elements are one of L-shaped and U-shaped and are disposed about a radial inner edge of said sealing ring facing the pipe member.

9. The system of claim 8, wherein a radially inward outer edge of said first and said second sealing elements facing said retention body is one of slanted and rounded-off.

10. The system of claim 7, wherein a radially inward outer edge of said first and said second sealing elements facing said retention body is one of slanted and rounded-off.

11. The system of claim 1, said retention body has a conical opening and wherein said sealing ring comprises a radially inward peripheral shoulder which, in an assembled state of the system, projects into said conical opening in said retention body.

12. The system of claim 11, wherein said retention body has a conical surface and said peripheral shoulder is cylindrical and, in an assembled state of the connection system, is separated from said conical surface of said retention body.

13. The system of claim 11, wherein said peripheral shoulder tapers conically towards said retention body.

14. The system of claim 11, wherein said first and said second sealing elements consist essentially of a single-piece layer of elastomer material drawn over said peripheral shoulder of said sealing ring.

15. The system of claim 14, wherein said layer of elastomer material has a thickness no greater than ½ mm.

16. The system of claim 1, wherein said coupling ring has an inner thread and further comprising outer threaded segments made from elastomer material and bonded about an outer periphery of the sealing ring for mating with said inner thread of said coupling ring.

17. The system of claim 1, wherein the second surface of the peripheral enlargement has a first section having a first radial slant angle in an outward direction and a second section adjacent to said first section having a second radial slant angle in the outward direction which is greater than said first radial slant angle, said second section extending to a maximum radius of said peripheral enlargement, and said sealing ring having a surface adjacent to the second surface of the peripheral enlargement to abut with the first and the second sections thereof.

18. The system of claim 1, wherein said front surface of said sealing ring is flat and is perpendicular to a symmetry axis of said sealing ring, said sealing ring having a section on a radially inner side thereof with a conical recess, wherein said first sealing element is disposed at said sealing ring front surface and said second sealing element is disposed on said inside surface of said sealing ring at a radially innermost portion thereof.

19. The system of claim 18, wherein said first and said second sealing elements are integral with each other.

20. The system of claim 18, wherein said conical recess has a cone angle between 20° and 45°.

21. The system of claim 18, wherein a radially outer section of said conical recess having a first cone angle is disposed axially adjacent to a radially inner section of said conical recess having a second cone angle, wherein said first cone angle is steeper than said second cone angle.

22. The system of claim 18, wherein said sealing ring has a peripheral shoulder which projects in an axial direction beyond said front surface of said sealing ring and is radially within said sealing ring front surface.

23. The system of claim 18, wherein said coupling rind has an inner thread and further comprising an outer threaded segment made from elastomer material bonded about an outer periphery of said sealing ring for mating with said inner thread of said coupling ring.

* * * * *